US007070033B2

(12) United States Patent
Jansen et al.

(10) Patent No.: US 7,070,033 B2

(45) Date of Patent: Jul. 4, 2006

(54) FLEXIBLE COUPLING WITH MISALIGNMENT COMPENSATION

(75) Inventors: Christian Jansen, Etobicoke (CA); John Antchak, Innisfail (CA)

(73) Assignee: Litens Automotive Partnership, Concord (CA)

(*) Notice: Subject to any disclaimer, the term of this patent is extended or adjusted under 35 U.S.C. 154(b) by 37 days.

(21) Appl. No.: 10/720,819

(22) Filed: Nov. 24, 2003

(65) Prior Publication Data

US 2004/0104090 A1 Jun. 3, 2004

Related U.S. Application Data

(60) Provisional application No. 60/428,467, filed on Nov. 22, 2002, provisional application No. 60/455,469, filed on Mar. 17, 2003, provisional application No. 60/485,664, filed on Jul. 8, 2003.

(51) Int. Cl.
*F16D 41/20* (2006.01)

(52) U.S. Cl. ................................ 192/41 S; 192/110 R

(58) Field of Classification Search ............. 192/41 R, 192/41 S, 55.1, 56.1, 56.2, 110 R, 115
See application file for complete search history.

(56) References Cited

U.S. PATENT DOCUMENTS

| | | | | |
|---|---|---|---|---|
| 1,472,782 | A | | 11/1923 | Barber |
| 2,196,841 | A | | 4/1940 | Sloan |
| 2,245,764 | A | | 6/1941 | Dome et al. |
| 2,254,566 | A | | 9/1941 | Cornell, Jr. |
| 2,979,925 | A | | 4/1961 | Hunderford, Jr. |
| 3,000,198 | A | | 9/1961 | Stout |
| 3,347,061 | A | | 10/1967 | Stuemky |
| 3,395,553 | A | * | 8/1968 | Stout ........................... 464/40 |
| 3,430,457 | A | | 3/1969 | Gee |
| 3,537,275 | A | * | 11/1970 | Smith .......................... 464/78 |
| 3,618,721 | A | * | 11/1971 | Hare ........................... 192/35 |
| 3,618,730 | A | | 11/1971 | Mould, III |
| 3,893,554 | A | * | 7/1975 | Wason ......................... 464/40 |
| 3,934,428 | A | | 1/1976 | Hedin |
| 4,190,138 | A | * | 2/1980 | Bendall ....................... 192/43 |
| 4,357,137 | A | | 11/1982 | Brown |
| 5,123,311 | A | | 6/1992 | Dymek |
| 5,468,188 | A | | 11/1995 | Day |
| 6,283,868 | B1 | | 9/2001 | Clarke et al. |

* cited by examiner

OTHER PUBLICATIONS

Power Transmission Design 1998, Couplings & U-Joints; p. A177 and Power Transmission Design 1997, Couplings & U-Joints; pp. A186-A194.

*Primary Examiner*—Saul Rodriguez
(74) *Attorney, Agent, or Firm*—Clark Hill PLC

(57) ABSTRACT

A flexible coupling assembly interconnects an output shaft and an input shaft. The flexible coupling assembly includes a first hub operatively coupled to the input shaft for rotation therewith. A second hub is operatively coupled to the output shaft for rotation therewith. A flexible element in the form of a coil spring interconnects the first and second hubs for transferring rotational torque between the first and second hubs while continuously compensating for axial misalignment between the first and second hubs. A retainer is disposed between the flexible element and the first and second hubs for limiting radial deflection of the flexible element during rotation of the flexible coupling. A one-way clutch is operatively coupled between the coil spring and one of the first and second hubs for transferring torque in one rotational direction while allowing the output shaft to decelerate relative to the input shaft in a direction other than the one rotational direction.

10 Claims, 3 Drawing Sheets

FLEXIBLE COUPLING WITH MISALIGNMENT COMPENSATION

BACKGROUND OF THE INVENTION

This application claims priority under 35 U.S.C. 119(e) to the provisional application 60/428,467 filed Nov. 22, 2002; to the provisional application 60/455,469, filed Mar. 17, 2003; and to the provisional application 60/485664, filed Jul. 8, 2003.

1. Field of the Invention

The invention relates to a flexible coupling for interconnecting a drive shaft of an automotive vehicle engine and a driven shaft of a driven accessory. More particularly, the invention relates to a connecting element within the flexible coupling that compensates for misalignment between the drive shaft of the engine and the driven shaft of the driven accessory.

2. Background of the Invention

It is widely known in an automotive vehicle engine to transfer a portion of the engine output to a plurality of belt driven accessories utilizing an endless serpentine belt. Typically, each component includes an input drive shaft and a pulley coupled to a distal end of the drive shaft for driving engagement with the belt. An example of such a belt driven accessory is an alternator. Increasingly, automotive vehicle manufacturers are choosing to drive such accessories directly with an engine driven output shaft. Due to packaging constraints and build tolerances, it is, however, not always possible or practicable to axially align the output shaft with the input shaft of the accessory. Further, directly driving the accessory with an output shaft exposes the accessory to vibrations associated with a running engine. Accordingly, it is desirable to provide a coupling that transmits rotational torque between the output and input shafts while compensating for misalignment and vibration therebetween.

SUMMARY OF THE INVENTION

According to one aspect of the invention, a flexible coupling assembly interconnects an output shaft and an input shaft. The flexible coupling assembly includes a first hub operatively coupled to the input shaft for rotation therewith. A second hub is operatively coupled to the output shaft for rotation therewith. A flexible element interconnects the first and second hubs for transferring rotational torque between the first and second hubs while continuously compensating for axial misalignment between the first and second hubs. A retainer is disposed between the flexible element and the first and second hubs for limiting radial deflection of the flexible element during rotation of the flexible coupling.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF PREFERRED EMBODIMENTS

Figure 1:
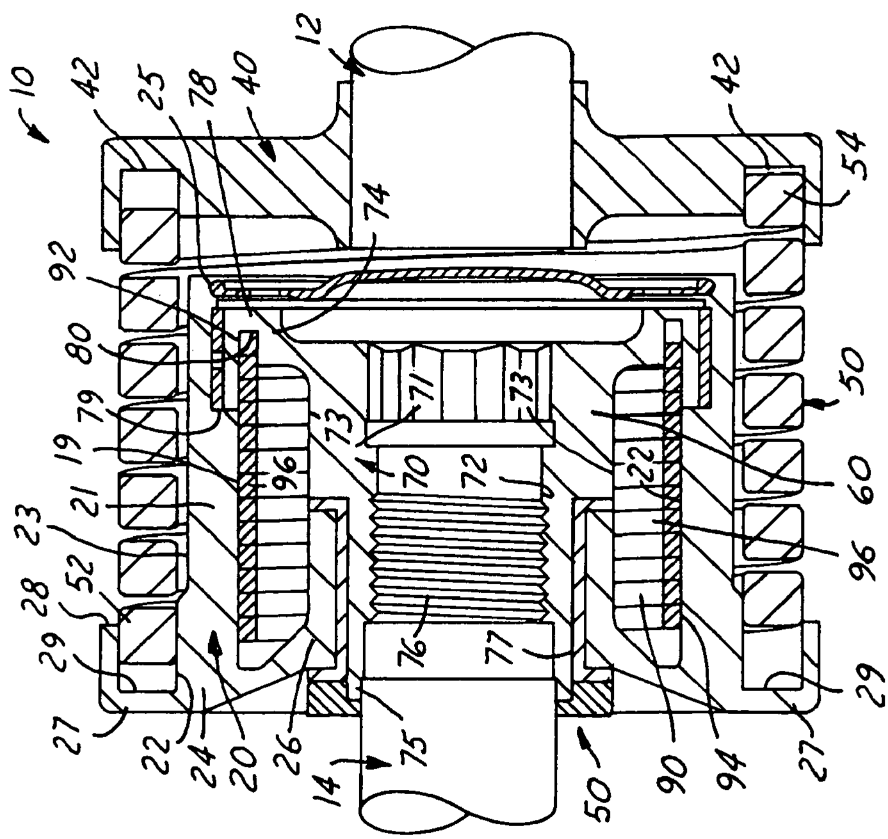
FIG. 1 is a cross-sectional side view of a flexible coupling assembly for a first embodiment of the invention.

Referring to FIG. 1, a flexible coupling assembly is generally indicated at 10 for transferring torque between a drive shaft 12 and a driven shaft 14. The drive shaft 12 receives a rotational force from an engine. The driven shaft 14 is driven by the drive shaft 12 via the flexible coupling assembly 10 and transfers the force generated by the engine to an engine driven accessory, such as an alternator or pump.

The flexible coupling 10 includes first 20 and second 40 hubs. The first hub 20 is fixedly secured to a distal end of the input shaft 14. The second hub 40 is fixedly secured to a distal end of the output shaft 12. The first hub 20 includes a helical first abutment surface 22 defined by a generally U-shaped channel formed in the face of the hub 20. The second hub 40 similarly includes a helical second abutment surface 42 defined by a generally U-shaped channel formed in the face of the hub 40 and opposing the first abutment surface 22. A flexible element in the form of a helical coil spring 50 extends between a first end 52 fixedly retained in the U-shaped channel of the hub 20 and engaged with the first abutment surface 22 and a second end 54 fixedly retained in the U-shaped channel of the hub 40 and engaged with the second abutment surface 42. The opposite ends 52, 54 of the coil spring 50 may be secured in the channels of the hubs 20, 40 by any suitable method such as crimping, welding, screwing, or held with fasteners or a retaining clip. The coil spring 50 serves as a first interconnection between the first 20 and second 40 hubs. The coil spring 50 is sufficiently rigid to transfer rotational torque between the output shaft 12 and the input shaft 14. Further, the coil spring 50 is sufficiently pliable to compensate for axial or angular misalignment between the output 12 and input 14 shafts.

A one-way clutch assembly 60 is coupled in series with and between the coil spring 50 and the input shaft 14. The clutch assembly 60 includes a third hub 70 having a cylindrical body 71 extending between generally cylindrical inner 72 and outer 73 hub surfaces. The inner 72 and outer 73 hub surfaces extend between opposite first 74 and second 75 ends of the third hub 70. The inner hub surface 72 includes a plurality of helical threads 76 for fixedly securing the third hub 70 to the distal end of the input shaft 14 for rotation therewith. The outer hub surface 73 is stepped to include a reduced diameter portion 77. An annular flange 78 extends radially outwardly from the outer hub surface 73 adjacent the first end 74. An annular surface 79 is formed in the flange 78 due to the larger diameter of the flange 78 relative to the outer hub surface 73. A helical abutment recess 80 is formed in the annular surface 79.

The first hub 20 is rotatably coupled to the third hub 70. The first hub 20 is axially aligned with the third hub 70. The first hub 20 includes a body 21 extending between generally cylindrical inner 19 and outer 23 hub surfaces. The inner 19 and outer 23 hub surfaces extend between opposite first 24 and second 25 ends of the first hub 20. An annular inner flange 26 is formed in the first hub 20 and extends between the inner hub surface 19 adjacent the first end 24 and the reduced-diameter portion 77 of the third hub 70. An annular outer flange 27 extends radially outwardly from the outer hub surface 23 adjacent the first end 24. An annular surface 28 is formed in the flange 27 due to the larger diameter of the flange 27 relative to the outer hub surface 23. A third abutment surface 29 defined by a generally U-shaped channel is formed in the annular surface 28 generally opposing the second abutment surface 42 of the second hub 40.

The clutch assembly 60 further includes a clutch spring 90 extending between a proximal end 92 nestingly retained in the abutment recess 80 of the third hub 70 and an opposite distal end 94. The clutch spring 90 includes a plurality of helical coils 96 extending between the proximal 92 and distal 94 ends. The coils 96 of the clutch spring 90 are pressed during assembly into frictional engagement with the inner hub surface 19 of the first hub 20. Preferably, the clutch spring 90 is formed from an uncoated, spring steel material and has a non-circular cross-section to improve frictional contact. Most preferably, the cross-section of clutch spring 90 is rectangular or square.

In operation, the engine rotatably drives the output shaft 12. The second hub 40 rotates with the output shaft 12. The coil spring 50 transfers rotational torque from the second hub 40 to the first hub 20. The inner hub surface 19 grippingly or brakingly engages at least one of the coils 96 of the clutch spring 90 as the first hub 20 accelerates relative to the third hub 70. The braking engagement between the inner hub surface 19 and at least one of the coils 96 of the clutch spring 90 causes the plurality of coils 96 to expand radially outwardly against the inner hub surface 19 until all of the coils 96 are brakingly engaged with the inner hub surface 19. With the clutch spring 90 fully brakingly engaged with the inner hub surface 19, rotation of the second hub 40 is fully directed toward rotatably driving the first hub 20 and the input shaft 14. Additionally, centrifugal forces help to retain the clutch spring 90 in braking engagement with the inner hub surface 19. A lubricant may be used to minimize wear between the coils 96 and the inner hub surface 19 during relative rotational movement between the first 20 and third 70 hubs, while maintaining a certain minimum coefficient of friction which is required to transfer torque between the first 20 and third 70 hubs.

When the second hub 40 decelerates with the output shaft 12 of the engine, the coil spring 50 causes the first hub 20 to decelerate with the second hub 40. The third hub 70, driven by the inertia associated with the rotating mass of the input shaft 14 and anything fixedly secured to the input shaft 14 within the engine driven accessory, "overruns" or continues to rotate at a higher speed than the first hub 20. The higher rotational speed of the third hub 70 relative to the first hub 20 tends to radially contract the plurality of coils 96 of the clutch spring 90 relative to the inner hub surface 72 of the third hub 70. The braking engagement between the clutch spring 90 and the inner hub surface 19 is relieved to allow the third hub 70 to overrun the first hub 20. The plurality of coils 96 remain, however, frictionally engaged with the inner hub surface 19 while the first hub 20 decelerates relative to the third hub 70. The plurality of coils 96 brakingly re-engage the inner hub surface 19, as described above, when the first hub 20 re-accelerates with the second hub 40 and the output shaft 12 beyond the speed of the third hub 70. Due to the transfer of torque between the first 20 and second 40 hubs by the coil spring 50, the clutch spring 90 cycles in and out of braking engagement with the inner hub surface 19 of the first hub 20 in response to the cyclical acceleration and deceleration, respectively, of the output shaft 12 relative to the input shaft 14.

It should be appreciated that the clutch assembly 60 can be any suitable variety of one-way clutch assemblies known by those of ordinary skill in the art to allow the transfer of torque between the first 20 and second 40 hubs in one direction driven by the engine and to allow the first hub 20 to decelerate relative to the third hub 70. It should also be appreciated that the clutch 60 may be coupled to either the output shaft 12 or the input shaft 13. It should further be appreciated that the coil spring 50 can be of any suitable type of flexible element that is sufficiently rigid to transfer torque between the output 12 and input 14 shafts and at the same time is sufficiently pliable to compensate for axial or angular misalignment between the output 12 and input 14 shafts.

Figure 2:
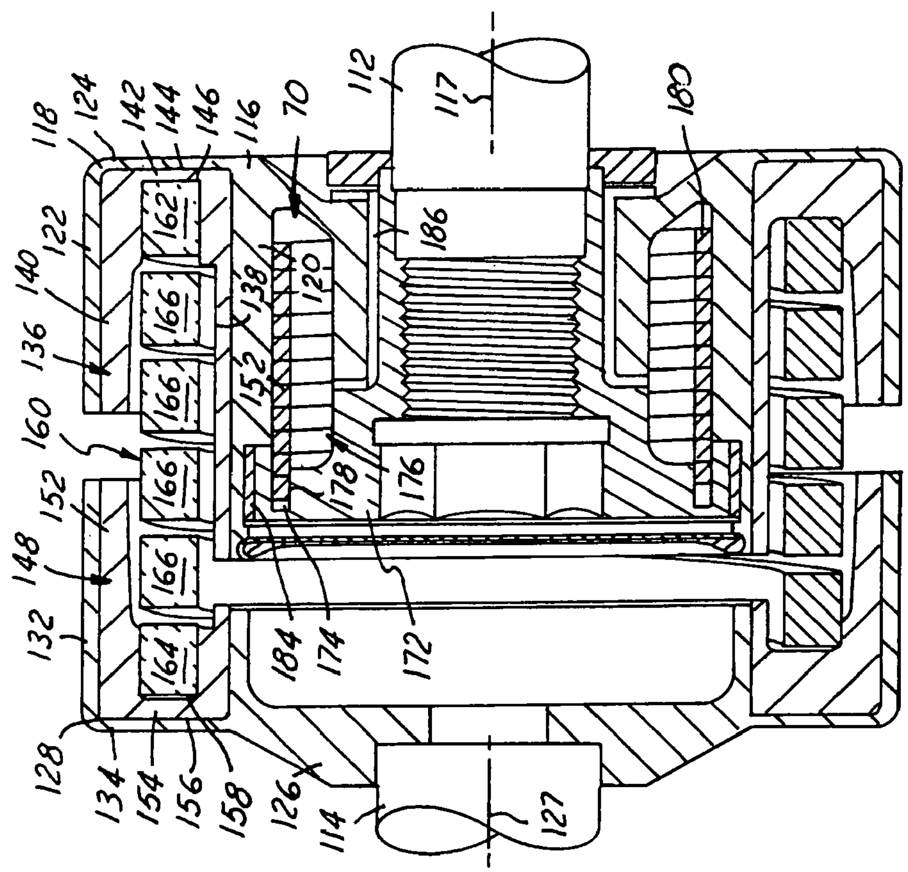
FIG. 2 is a cross-sectional side view of a second embodiment of the flexible coupling assembly including a clutch mechanism.

Referring to FIG. 2, a second embodiment 100 of the present invention is illustrated. A ring-shaped first retainer, generally shown at 136, is seated within the first annular slot 118. The first retainer 136 includes a J-shaped cross section defined by a third inner wall 138, a third outer wall 140 and a third connecting wall 142 extending radially therebetween. The third inner wall 138 is adjacent to the first inner wall 120. The third outer wall 140 is adjacent to the first outer wall 122. The third connecting wall 142 extends between a first hub surface 144 adjacent to the first connecting wall 124 and a first abutment surface 146. The first abutment surface 146 is helically ramped relative to the first hub surface 144. The first retainer 136 and the first hub 116 are keyed or fixedly secured to each other to prevent relative rotation of the first retainer 136 relative to the first hub 116.

A ring-shaped second retainer, generally shown at 148, is seated within the second annular slot 128. The second retainer 148 includes a J-shaped cross section defined by a fourth inner wall 150, a fourth outer wall 152 and a fourth connecting wall 154 extending radially therebetween. The fourth inner wall 150 is adjacent to the second inner wall 130. The fourth outer wall 152 is adjacent to the second outer wall 132. The fourth connecting wall 154 extends between a second hub surface 156 adjacent to the second connecting wall 134 and a second abutment surface 158. The second abutment surface 158 is helically ramped relative to the second hub surface 156 and generally opposes the first abutment surface 146. A relief surface extends between first and second ends of the second abutment surface 158. The second retainer 148 and the second hub 126 are keyed or fixedly secured to each other to prevent relative rotation of the second retainer 148 relative to the second hub 126.

A torque spring, generally shown at 160, extends between the first 146 and second 158 abutment surfaces for transferring torque between the first 116 and second 126 hubs. The torque spring 160 includes a first end 162 seated along the first abutment surface 146 and a second end 164 seated along the second abutment surface 158. The first end 162 is bent and extends into a corresponding slot (not shown) formed in the first retainer 136 to prevent relative rotation of the first end 162 relative to the first retainer 136. Similarly, the second end 164 is bent and extends into a corresponding slot (not shown) formed in the second retainer 148 to prevent relative rotation of the second end 164 relative to the second retainer 148. The torque spring 160 include a plurality of coils 166 extending helically between the first 162 and second 164 ends. The torque spring 160 also isolates the driven shaft 114 from vibrations associated with the rotation of the drive shaft 112 or vice versa.

Bushings 184, 186 are disposed between the first 116 and third 172 hubs to minimize friction during relative rotation of the first hub 116 relative to the third hub 172. Alternatively, ball bearings may be used instead of the bushings 184, 186.

The plurality of coils 182 is pressed during assembly into frictional engagement with first inner wall 120 of the first hub 116. The plurality of coils 182 is wound helically between the proximal 178 and distal 180 ends so that displacement of the proximal end 178 relative to the distal end 180 in a driven direction causes the plurality of coils 182 to expand radially outwardly against the first inner wall 120. Displacement of the proximal end 178 relative to the distal end 180 in an opposite direction causes the plurality of coils 182 to contract radially inwardly from the first inner wall 120.

Preferably, the clutch spring 176 is formed from an uncoated, spring steel material. Most preferably, the cross-section of each of the plurality of coils 182 is rectangular or square to improve frictional contact with the first inner wall 120. The cross-section of each of the plurality of coils 182 may, however, be non-rectangular. A lubricant may be applied between the clutch spring 176 and the first inner wall 120 to minimize wear during relative rotation of the first hub 116 relative to the clutch spring 176.

In use, acceleration of the drive shaft 112 in the driven direction causes the third hub 172 to accelerate relative to the first hub 116. The displacement of the proximal end 178 with the third hub 172 relative to the distal end 180 in the driven direction tends to expand the plurality of coils 182 radially outwardly against the first inner wall 120. The plurality of coils 182 of the clutch spring 176 grips the first inner wall 120 so that torque is transferred from the third hub 172 to the first hub 116 by the clutch spring 176. The first hub 116 rotates with the third hub 172 in the driven direction. Torque from the first hub 116 is transferred to the second hub 126 by the torque spring 160. The driven shaft 114 rotates with the second hub 126.

The plurality of coils 166 of the torque spring 160 may expand radially outwardly toward the third 140 and fourth 152 outer walls. The radial expansion of the plurality of coils 166 of the torque spring 160 may be due to rotational displacement of the first end 162 relative to the second end 164 or to centrifugal forces, particularly at high rotational speeds. The radial expansion of the plurality of coils 166 of the torque spring 160 is limited by contact of the plurality of coils 166 with the third 140 and fourth 162 outer walls.

Deceleration of the drive shaft 112 relative to the first hub 116 rotatably displaces the distal end 180 of the clutch spring 176 relative to the proximal end 178 and the third hub 172 in an opposite direction from the driven direction. The plurality of coils 182 contracts radially inwardly relative to the first inner wall 120, which causes the plurality of coils 182 to lose grip with the first inner wall 120. Momentum associated with the first hub 116, the torsion spring 160, the second hub 126, the first retainer 136 and second retainer 148, the driven shaft 114 and any rotating mass attached to the driven shaft 114 allows the driven shaft 114 to rotate at a higher speed than or “overrun” the drive shaft 112. Acceleration of the drive shaft 112 relative to the driven shaft 114 in the driven direction causes the clutch spring 176 to re-grip the first inner wall 120 so that torque from the drive shaft 112 is transferred to the driven shaft 114, as described above.

It should be appreciated that the torque spring 160 is sufficiently rigid to transmit torque between the first 116 and second 126 hubs. At the same time, the torque spring 160 is sufficiently pliable to accommodate a predetermined amount of axial misalignment, wherein the first 117 and second 127 axes are either non-parallel or parallel and non-coaxial. The torque spring 160 can also accommodate relative axial displacement between the first 116 and second 126 hubs.

Figure 3:
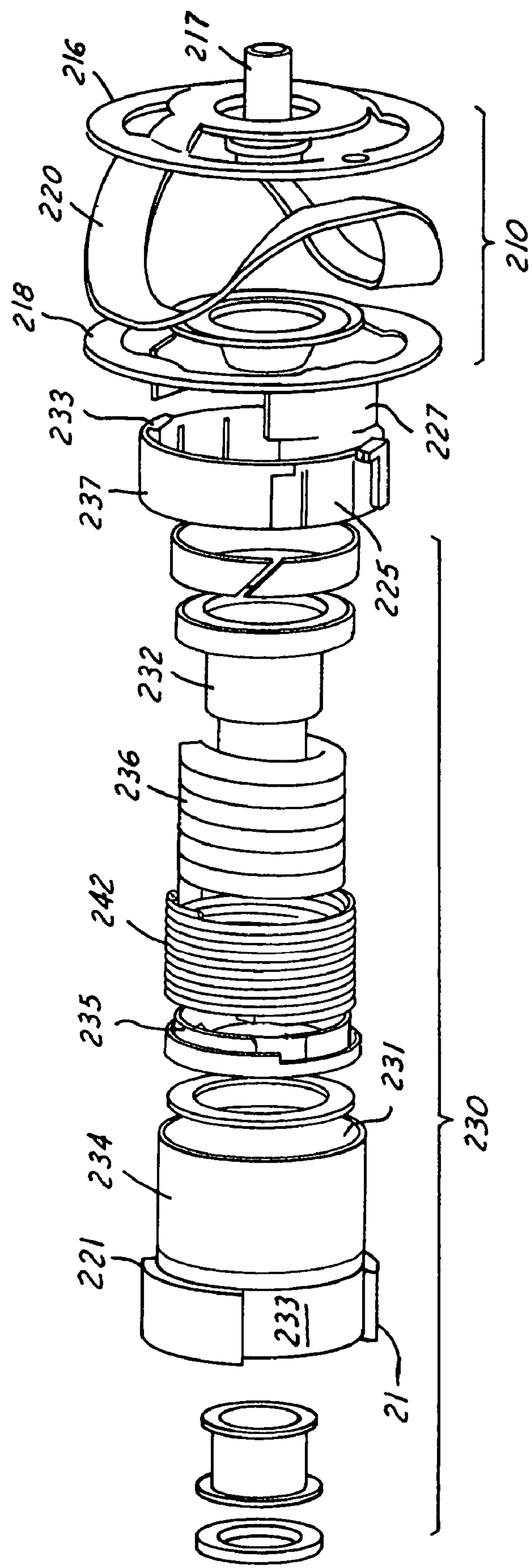
FIG. 3 is a cross-sectional side view of the second embodiment of the flexible coupling assembly having misaligned first and second hubs.
Figure 4:
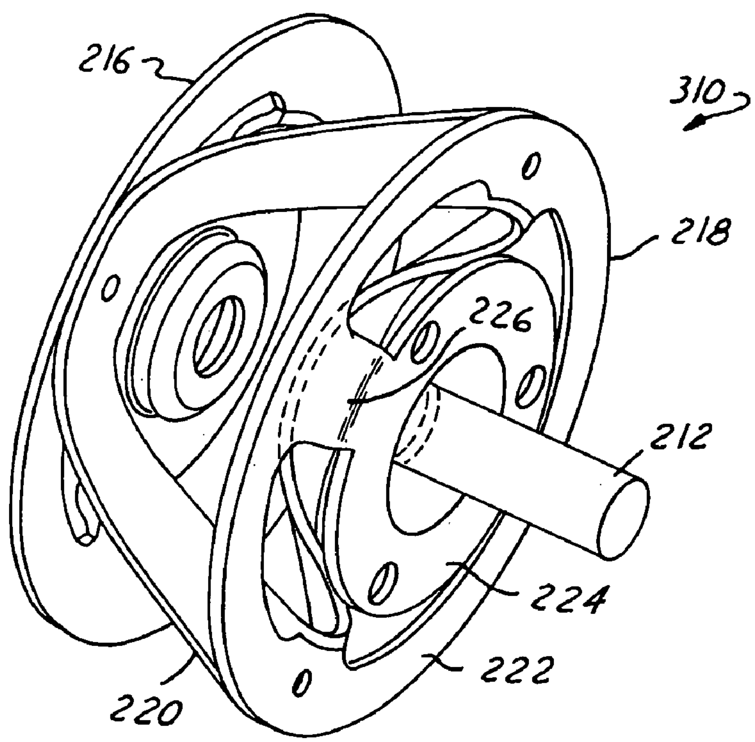
FIG. 4 is an exploded perspective view of the second embodiment of the flexible coupling assembly.

Referring to FIG. 3, a third embodiment 200 of the present invention is illustrated. A decoupler mechanism 230 as described previously is operatively coupled between the first 116 and second 118 discs to allow the driven shaft to overrun the drive shaft 212. The decoupler mechanism includes a first hub 232 and a second hub 234. The second hub 234 extends between opposite and cylindrical inner 231 and outer 233 hub surfaces. The first hub 232 is fixedly secured to the driven shaft. The second hub 234 is rotatably coupled to the first hub 232.

A retainer ring 235 is rotatably coupled to the inner hub surface 231 of the second hub 234. A torsional spring 236 extends between a first end fixedly secured to the first hub 232 and a second end fixedly secured to the retainer ring 235 for transferring torque between the first hub 232 and the torsional ring 235. A one-way clutch spring 242 extends between a proximal end fixedly secured to the retainer ring 235 and a distal end. The clutch spring 242 includes a plurality of coils expanded radially outwardly with the inner hub surface for frictional engagement therewith.

An interface ring 237 fixedly interconnects the second disc 218 to the outer surface 233 of the second hub 234. More specifically, the outer hub surface 233 includes a plurality of stepped protrusions 221 that extend radially outwardly therefrom. The interface ring 237 includes a plurality of abutment edges 223 that correspond to the plurality of stepped protrusions 221. The interface ring 237 extends around second hub 234, such that the plurality of abutment edges 223 engage the plurality of stepped protrusions 221 to prevent rotation of the interface ring 237 with respect to the second hub 234. Preferably, the interface ring 237 is allowed to slide axially with respect to the second hub 234 to help accommodate axial misalignment between the drive 212 and driven shafts. The interface ring 237 includes at least one slot 225 formed therein and the second disc 218 includes at least one leaf 227 corresponding to the slot 225 min complementary fit. The leaf 227 projects axially from the second disc 218 and engages the corresponding slot 225 for rotatably securing the second disc 218 with respect to the second hub 234. Preferably, the interface ring 237 is formed from plastic to prevent metal-to-metal contact between the second disc 218 and the second hub 24.

A first disc 216 fixedly secured to the drive shaft 212 and second disc 218 fixedly secured to the driven shaft. First disc 216 and second disc 218 are optionally identical to minimize part count. Each disc 216, 218 has an outer ring 222 and an inner hub 224. The inner hub 224 has a cup shape. The inner hub 224 is connected to the outer ring by two diametrically opposed tabs 226.

A connecting element 220 interconnects and transfers torque between the first 216 and second 218 discs. The connecting element 220 is generally ring shaped wave spring and has at least two peaks and two valleys. The connecting element 220 is fixedly secured to the first 216 and second 218 discs, respectively, by rivets, welding or the like. The contact point between the connecting element 220 and each of the first and second discs 216, 218 is at a diameter 90° relative to the tabs 226.

In operation, the drive shaft 212 is rotated by the engine in a driven direction. The first disc 216 rotates with the drive shaft 212. The second disc 218 rotates with the first disc 216 via the connecting element 220. The second hub 234 rotates with the second disc 218. Rotation of the second hub 234 in the driven direction relative to the retainer ring 235 causes the coils 248 of the clutch spring 242 to expand radially outwardly toward and grip the inner hub surface 231, such that the retainer ring 235 rotates with the second hub 234.

The torsional spring 236 transfers torque from the retainer ring 235 to the first hub 232, so that the first hub 232 and the driven shaft rotate with the retainer ring 25. When the drive shaft 212 decelerates relative to the driven shaft, the clutch spring 242 contracts with respect to the inner hub surface 231. The clutch spring 242 releases and slips relative to the inner hub surface 231, which allows retainer ring 235 and, ultimately, the driven shaft to overrun or continue to rotate at a higher speed than the drive shaft 212.

Figure 5:
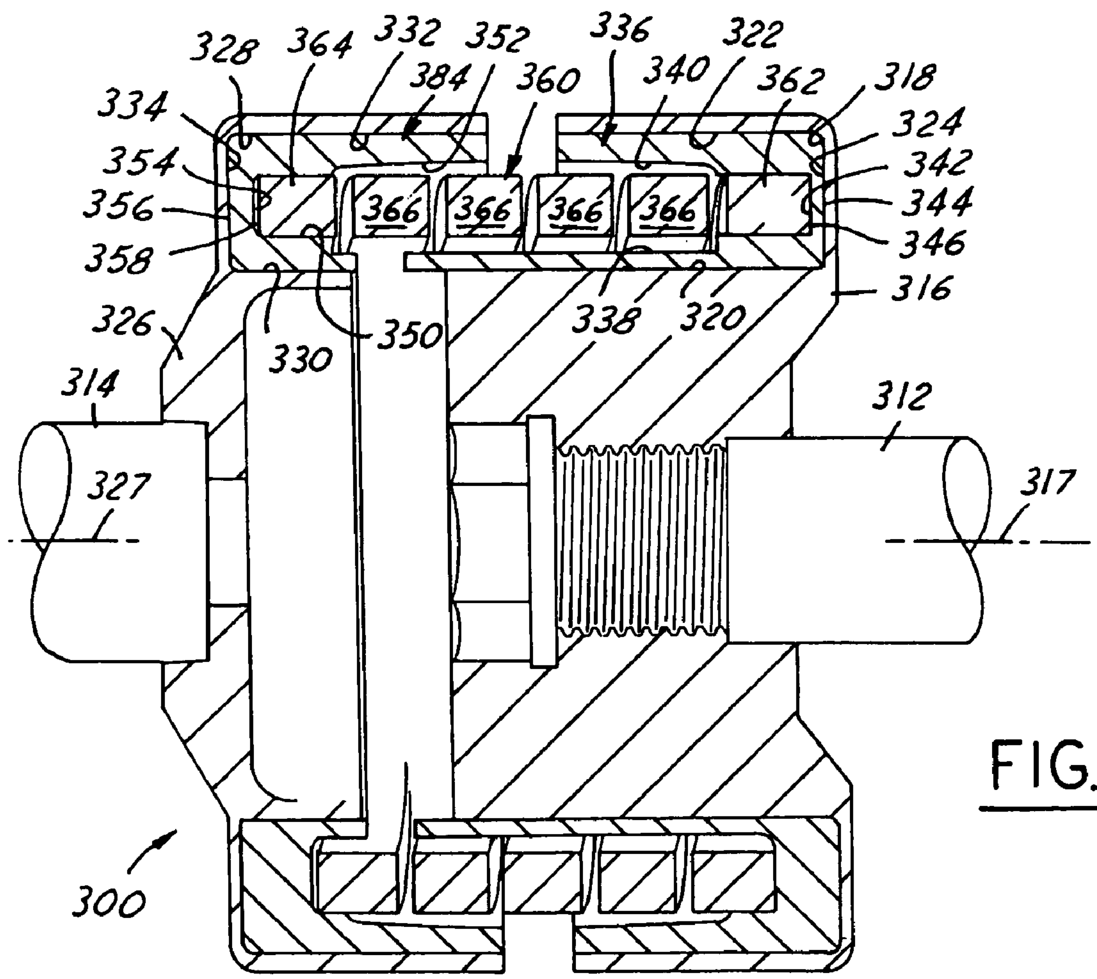
FIG. 5 is a fragmentary perspective view of the second embodiment of the flexible coupling assembly.

Referring to FIG. 5, a fourth embodiment 300 of the present invention is illustrated. The flexible coupling assembly 300 includes a generally cylindrical first hub 316 that is adapted to be fixedly secured to the drive shaft 312 for rotation therewith about a first axis 317 defined by the drive shaft 312. The first hub 316 includes a first annular slot 318. The first annular slot 318 has a cross section defined by a first inner wall 320, a first outer wall 322 and a first connecting wall 324 extending radially therebetween.

A second hub 326 is adapted to be fixedly secured to the driven shaft 314 for rotation therewith about a second axis 327 defined by the driven shaft 314. The second hub 326 includes a second annular slot 328. The second annular slot 328 has a cross section defined by a second inner wall 330, a second outer wall 332 and a second connecting wall 334 extending radially therebetween.

A ring-shaped first retainer 336 is seated within the first annular slot 318. The first retainer 336 includes a cross section defined by a third inner wall 338, a third outer wall 340 and a third connecting wall 342 extending radially therebetween. The third inner wall 338 is adjacent to the first inner wall 320. The third outer wall 340 is adjacent to the first outer wall 322. The third connecting wall 342 extends between a first hub surface 344 adjacent to the first connecting wall 324 and a first abutment surface 346. The first abutment surface 346 is helically ramped relative to the first hub surface 344. The first retainer 336 and the first hub 316 are keyed or fixedly secured to each other to prevent relative rotation of the first retainer 336 relative to the first hub 316.

A ring-shaped second retainer 48 is seated within the second annular slot 328. The second retainer 348 includes a cross section defined by a fourth inner wall 350, a fourth outer wall 352 and a fourth connecting wall 354 extending radially therebetween. The fourth inner wall 350 is adjacent to the second inner wall 330. The fourth outer wall 352 is adjacent to the second outer wall 332. The fourth connecting wall 354 extends between a second hub surface 356 adjacent to the second connecting wall 334 and a second abutment surface 358. The second abutment surface 358 is helically ramped relative to the second hub surface 356 and generally opposes the first abutment surface 346. A relief surface extends between first and second ends of the second abutment surface 358. The second retainer 348 and the second hub 326 are keyed or fixedly secured to each other to prevent relative rotation of the second retainer 348 relative to the second hub 326.

A torque spring 60 extends between the first 346 and second 358 abutment surfaces for transferring torque between the first 316 and second 326 hubs. The torque spring 60 includes a first end 362 seated along the first abutment surface 346 and a second end 364 seated along the second abutment surface 358. The first end 362 is bent and extends into a corresponding slot (not shown) formed in the first retainer 336 to prevent relative rotation of the first end 362 relative to the first retainer 336. Similarly, the second end 364 is bent and extends into a corresponding slot (not shown) formed in the second retainer 348 to prevent relative rotation of the second end 364 relative to the second retainer 348. The torque spring 360 include a plurality of coils 366 extending helically between the first 362 and second 364 ends. The torque spring 360 isolates the driven shaft 314 from vibrations associated with the rotation of the drive shaft 312 or vice versa.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A flexible coupling assembly for interconnecting an output shaft and an input shaft, said flexible coupling assembly comprising:

a first hub configured to mount to the input shaft for rotation therewith;

a second hub configured to mount to the output shaft for rotation therewith;

a first flexible element interconnecting said first and second hubs for transferring rotational torque between said first and second hubs while continuously compensating for axial misalignment between said first and second hubs, said flexible element having a first end fixedly secured to said first hub, a second end fixedly secured to said second hub, and a plurality of helical coils extending between said first and second ends for transferring said rotational torque therebetween; and a one-way clutch operatively coupled between said first hub and said input shaft for transferring torque in a first rotational direction from said first hub to said input shaft while allowing the output shaft to rotate relative to the input shaft in an opposite second rotational direction, said one-way clutch comprising a third hub adapted to be fixedly secured to said input shaft and a second flexible element coupled between said first hub and said third hub, said second flexible element having a first end fixedly secured to said third hub, a second free end, and a plurality of helical coils extending therebetween and in frictional engagement with said first hub for selectively coupling said first and third hub to transfer torque in said first rotational direction.

2. A flexible coupling assembly as set forth in claim 1 wherein said second flexible element is a coil spring.

3. A flexible coupling assembly as set forth in claim 2 wherein said coil spring has a rectangular cross-section.

4. A flexible coupling assembly as set forth in claim 1 wherein said assembly further comprises a first retainer disposed between said flexible element and said first hub, and a second retainer disposed between said flexible element and said second hub, said retainers each configured to limit radial deflection of said flexible element during rotation of said flexible coupling assembly.

5. A flexible coupling assembly as set forth in claim 4 wherein said first and second retainers each has a helically ramped surface that receives an end of the flexible element.

6. A flexible coupling assembly as set forth in claim 5 wherein said first retainer is ring-shaped having a generally J-shaped cross section and said second retainer is ring-shaped having a generally J-shaped cross section.

7. A flexible coupling assembly as set forth in claim 6 wherein said first retainer and said first hub cooperatively limit expansion a first portion of said flexible element and said second retainer and said second hub cooperatively limit expansion of a second portion of said flexible element.

8. A flexible coupling assembly as set forth in claim 1 wherein said assembly further comprises a second flexible element interconnecting said first and second hubs for transferring rotational torque therebetween.

9. A flexible coupling assembly as set forth in claim 8 wherein the second flexible element comprises a first disc operative connected to said first hub and a second disc operatively connected to said second hub and a wave spring extending between said first and second discs.

10. A flexible coupling assembly as set forth in claim 9 wherein said second flexible element surrounds said first flexible element.

* * * * *